United States Patent [19]

Harm

[11] Patent Number: 4,844,399
[45] Date of Patent: Jul. 4, 1989

[54] GOLF BAG CART BEVERAGE HOLDER

[76] Inventor: John F. Harm, 7952 Boxford Cir., Clay, N.Y. 13041

[21] Appl. No.: 231,964

[22] Filed: Aug. 15, 1988

[51] Int. Cl.⁴ .............................................. A47K 1/08
[52] U.S. Cl. ................................... 248/311.2; 224/274
[58] Field of Search ..................... 248/311.2, 313, 230, 248/231; 211/81, 82, 74; 224/274; 220/19

[56] References Cited

U.S. PATENT DOCUMENTS

| | | | |
|---|---|---|---|
| 2,991,907 | 7/1961 | Kinnison | 248/311.2 X |
| 3,131,842 | 5/1964 | Dingle | 224/274 |
| 3,269,683 | 8/1966 | Shinaver | 248/311.2 X |
| 3,564,743 | 2/1971 | Gilmoure | 248/231 X |
| 3,734,439 | 5/1973 | Wintz | 220/19 X |
| 3,840,204 | 10/1974 | Thomas | 248/311.2 |
| 4,191,350 | 3/1980 | Ormond | 248/311.2 X |
| 4,256,281 | 3/1981 | Harris | 248/311.2 X |
| 4,730,803 | 3/1988 | Hillstrom | 248/231 |

Primary Examiner—J. Franklin Foss
Attorney, Agent, or Firm—Charles S. McGuire

[57] ABSTRACT

A holder for beverage containers such as cans or bottles which includes a U-shaped bracket for frictional attachment to a tubular section of a golf cart. A pair of circular members are mounted on the bracket by a linear extension for freely pivoting movement. The linear extension in one embodiment is formed integrally with the circular member, and in another embodiment a single rod passes through the bracket legs and the circular members are fixedly attached to opposite ends of the rod. Flexible strips are attached to the circular members to provide the holder or support for the bottom of can or bottle encircled by the circular member.

11 Claims, 2 Drawing Sheets

GOLF BAG CART BEVERAGE HOLDER

BACKGROUND OF THE INVENTION

This invention relates to beverage holders and, more particularly, to a novel, pivotally supported beverage holder especially constructed for mounting on tubular sections of golf bag cart handles.

Heretofore there has emerged a small variety of beverage can or bottle holders for installation on golf bag carts and th like which include means for gravity balance such that the beverage container remains in an upright position notwithstanding the angle at which the golf cart is tilted. For example, U.S. Pat. No. 3,734,439, issued to Wintz, discloses a beverage container receptacle and clamp designed for use on a golf cart handle. The Wintz invention employs clip and clamp means which is adjustable to mount on a tubular section, the pivot means extending from the clip such that the beverage container receptacle may remain in an essentially vertical orientation upon movement of the tubular section. U.S. Pat. No. 3,131,842, issued to Dingle, Jr. et al, discloses a carrier attachment for golf bag carts which employs clamp attachment means including bolt extensions attached to a U-shaped bracket which comprises the pivot means. Specially constructed beverage container supports are then attached to the pivotable bracket.

It is thus evident that the closest art fails to provide a beverage holder for golf carts in which an upper circular member of a drink holder extends directly into the support bracket, thereby providing the pivotal mounting member.

It is therefore an object of the present invention to provide a golf bag cart beverage holder which is effective to keep a beverage in an upright position.

It is a further object to provide a golf bag cart beverage holder which is both easy to attach and remove from any tubular section.

A still further object is to provide a golf bag cart beverage holder in which the pivot means comprises the beverage holder member which extends directly into the support bracket, thereby simplifying the design and providing a more economical fabrication.

SUMMARY OF THE INVENTION

There is provided a golf bag cart beverage holder of the gimballed type which may be easily mounted to the tubular section of a golf bag cart.

An adjustable, elongated metallic strip, including clamp means, is concentrically attached to the tubular section of a golf bag cart. A U-shaped bracket is attached to the metallic strip through aligned slots in the bracket backing such that the bracket backing lays tangent to the cart tubular section, the bracket sides extending perpendicularly therefrom.

Two circular members, each including a linear extension passing through cooperatively placed holes in both sides of the U-shaped bracket, provide the pivotal mounting members. Securing means are attached to the linear extensions adjacent the bracket sides to prevent linear movement of the extensions through the bracket after assembly while permitting the desired pivotal movement. The circular members are attached to, or formed integrally with the linear extensions on opposite sides of the bracket.

A pair of elongated, resilient, ribbon-type strips are attached at both ends to opposite sides of the upper circular members in a criss-crossing relationship, thereby forming two beverage receptacle areas. Once beverages are placed in the receptacles, the golf bag cart handle may be tipped at any angle and the beverages will remain in an essentially upright position, thereby preventing any spillage of the beverage which would normally occur with a holder lacking the gimballed feature of the present invention.

DETAILED DESCRIPTION

Figure 1:
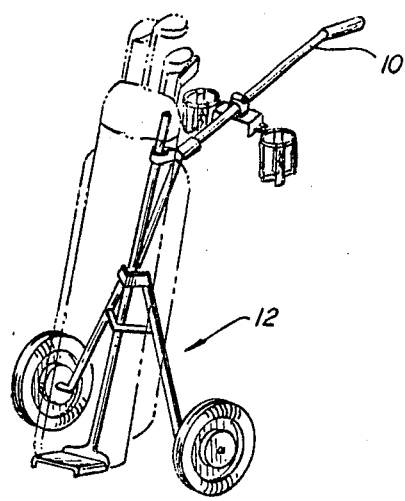
FIG. 1 is a front perspective view showing the invention att to the tubular section of a golf bag cart.

Referring now to the drawings, the invention includes a pair of beverage container holders, a generally U-shaped bracket upon which the holders are pivotally mounted, and means for securing the bracket to a tubular member, such as the handle 10 of conventional golf bag cart 12. The frame of cart 12, including handle 10, is rotated about the axis of the cart wheels as it is moved between an upright, stationary position and a tilted position for pulling or pushing the cart upon its wheels.

Figure 3:
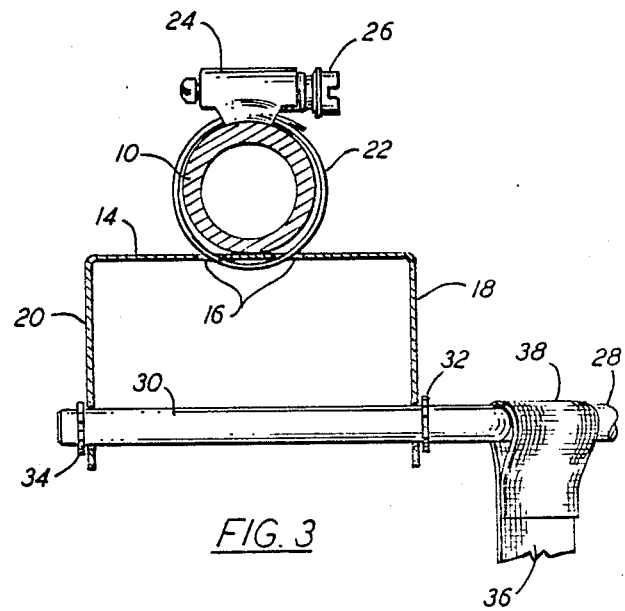
FIG. 3 is a front elevational view of a portion of the beverage holder of FIG. 2, in section taken generally along the line 3—3 thereof.
Figure 2:
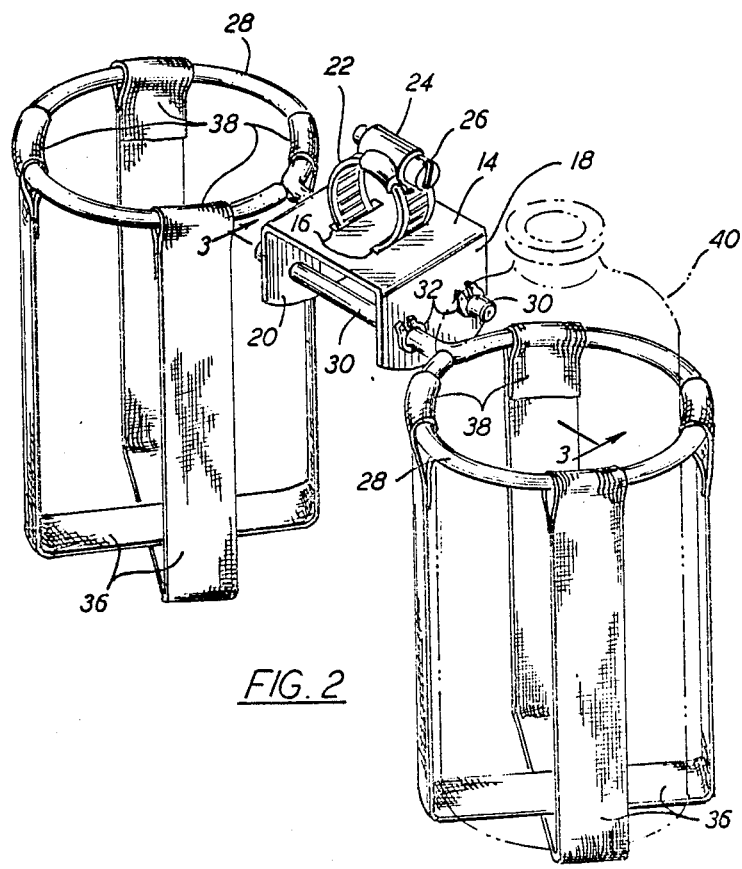
FIG. 2 is a perspective view of the beverage holder of the invention.
Figure 4:
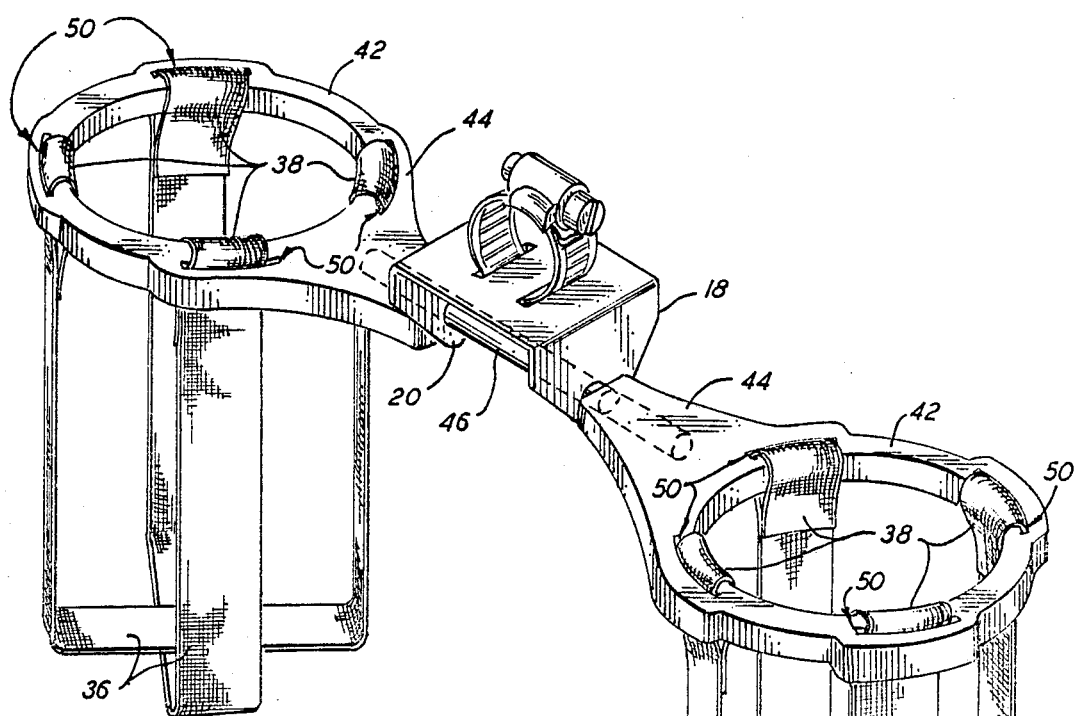
FIG. 4 is an alternate embodiment of the invention of FIGS. 1-3, shown in front perspective view.
Figure 5:
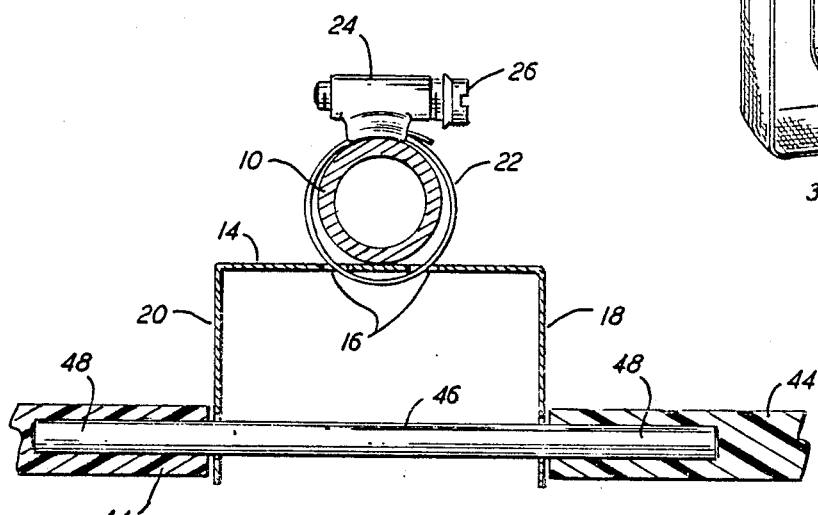
FIG. 5 is a fragmentary cross-sectional view, taken generally along the line 5—5 of FIG. 4.

The beverage container holders are shown in a first embodiment in FIGS. 2 and 3, and in a second embodiment in FIGS. 4 and 5. The bracket, and means for securing the device to tubular member 10 are basically the same in both embodiments, whereby common reference numerals are used for these elements throughout the several views. The bracket includes medial portion 14, having spaced, elongated, parallel openings 16 therein, and legs 18 and 20 extending perpendicularly from portion 14. The bracket is mounted upon tubular section 10 by flexible strip 22, which passes through openings 16 and encircles tubular section 10. Strip 22 is secured in position to hold medial portion 14 of the bracket in firm contact with the peripheral surface of tubular section 10, by clamp 24 which holds the overlapping ends of strip 22 in frictional engagement and may be tightened in conventional fashion by means of screw 26.

Referring now to the beverage container holders of FIGS. 2 and 3, which are essentially identical in construction, each includes a rigid metal or plastic rod having a first portion 28 formed in a circular configuration, and a second portion 30 extending integrally and linearly therefrom. Linear portions 30 of the two holders each extend loosely through aligned openings in the two legs 18 and 20 of the bracket, placing portions 30 in spaced, parallel relation to one another. After portions 30 have been inserted through the openings in the bracket legs, they are retained against linear movement in either direction through the bracket openings by snap rings 32 and 34, or other conventional retaining means such as cotter pins, or the like.

The preferred support for the beverage containers comprise a pair of elongated strips of flexible material 36, each having end portions 38 looped around circular portion 28 of the holders, and secured on opposite sides of portion 28. The two strips on each holder are arranged at 90° to one another so that the lower ends of the strips cross to form a support for the beverage container, one of which is shown in phantom lines in FIG. 2 and indicated by reference numeral 40.

Turning now to the embodiment of the container holders of FIGS. 4 and 5, circular members 42, having integral portions 44, are preferably of molded plastic material. A single, linear rod 46 passes loosely through aligned openings in bracket legs 18 and 20. Opposite end portions 48 of rod 46 are fixedly secured in recesses in portions 44 of the holder. When permanently assembled in this manner, there is no requirement for additional retaining means such as snap rings 32 and 34 of the previously described embodiment. End portions 38 of strips 36 pass through arcuate slots 50 in circular portions 42 of the holders.

In both embodiments, the container holders are pivotally mounted upon the bracket for freely rotating movement with respect thereto, in the first embodiment by linear portions 30 and in the second by rod 46. It is intended that the rotational position of strip 22 upon tubular section 10 be adjusted so that the axis of rotation of the holders are essentially parallel to the axis of the wheels of bag cart 12. In this manner, as cart 12 is tilted about the axis of its wheels, the beverage container holders, and thus any containers placed therein, will rotate by gravity to maintain the beverage containers in the upright position.

What is claimed is:

1. A beverage container holder for mounting on a tubular section of a golf bag cart comprising, in combination:
   (a) a U-shaped bracket including a medial portion and two spaced, parallel leg portions extending perpendicularly therefrom;
   (b) at least one upper circular member including a linear extension affixed to and extending radially outwardly from said circular member and through two cooperatively placed holes in said bracket leg portions;
   (c) means securing said linear extension to said bracket for freely pivotal movement of said upper circular member with respect thereto about said extension;
   (d) holding means attached to and suspended from said circular member to provide a support for the lower end of a beverage container encircled by said circular member; and
   (e) means for attaching said bracket to said tubular section by a member fixedly attached to said bracket medial portion and frictionally engaged with said tubular section.

2. The invention according to claim 1 wherein said attaching means comprises an elongated, flexible strip having two opposite ends, said strip passing through a pair of openings in said bracket medial portion and encircling said tubular section.

3. The invention according to claim 2 wherein one of said two opposite ends overlays the second of said opposite ends, and further including a friction clamp attached to said overlaying strip ends such that said metallic strip is frictionally secured to said tubular section.

4. The invention according to claim 3 wherein said holding means comprises a plurality of elongated flexible strips including two ends attached to opposite sides of said upper circular member, said strips attached in a criss-cross relationship.

5. The invention according to claim 1 wherein said linear extension is formed integrally with said circular member.

6. The invention according to claim 5 wherein said circular member and linear extension are formed from a single metal rod of circular cross section bent to said circular and linear configuration.

7. The invention according to claim 6 wherein said securing means comprises a pair of elements secured to said linear extension on opposite sides of said bracket leg portions.

8. The invention according to claim 7 wherein said elements comprise snap rings.

9. The invention according to claim 5 wherein said beverage container holder comprises a pair of said circular members, each having a linear extension extending through a respective pair of cooperatively placed holes in said bracket leg portions, the linear extensions of said circular members being substantially parallel to one another.

10. The invention according to claim 1 wherein said beverage container holder comprises a pair of said circular members.

11. The invention according to claim 10 wherein said linear extension comprises a single rod extending through said bracket leg portions and affixed at opposite ends to each of said circular members.

* * * * *